United States Patent

[11] 3,536,119

[72] Inventor Charles H. Mayer
   Stratford, Connecticut
[21] Appl. No. 692,044
[22] Filed Dec. 20, 1967
[45] Patented Oct. 27, 1970
[73] Assignee National Distillers and Chemcial
   Corporation
   New York, New York
   a corporation of Virginia

[54] DUAL VALVE FOR PNEUMATIC TIRES
   6 Claims, 7 Drawing Figs.
[52] U.S. Cl. .................................................... 152/427,
   152/428
[51] Int. Cl. ...................................................... B60c 29/00,
   F16k 11/06
[50] Field of Search .......................................... 152/427,
   340, 428; 137/223

[56] References Cited
   UNITED STATES PATENTS
   2,991,821   7/1961   Williams ...................... 152/427
   3,065,763   11/1962  Howard ....................... 152/427

Primary Examiner—Arthur L. La Point
Assistant Examiner—Robert Saifer
Attorney—Allen A. Meyer ABSTRACT: A single valve for controlling air pressure in both an inner tube and the volume between a "tubeless" tire and the inner tube. A valve stem carries an axially movable hollow shaft which has an outlet channel which is axially moved to fill the interior of a tubeless tire in one axial position and the volume between the tire wall and inner tube when in a second axial position.

Patented Oct. 27, 1970

INVENTOR.
CHARLES H. MAYER
BY Allen A. Meyer
Allen A. Meyer, Jr.
ATTORNEY

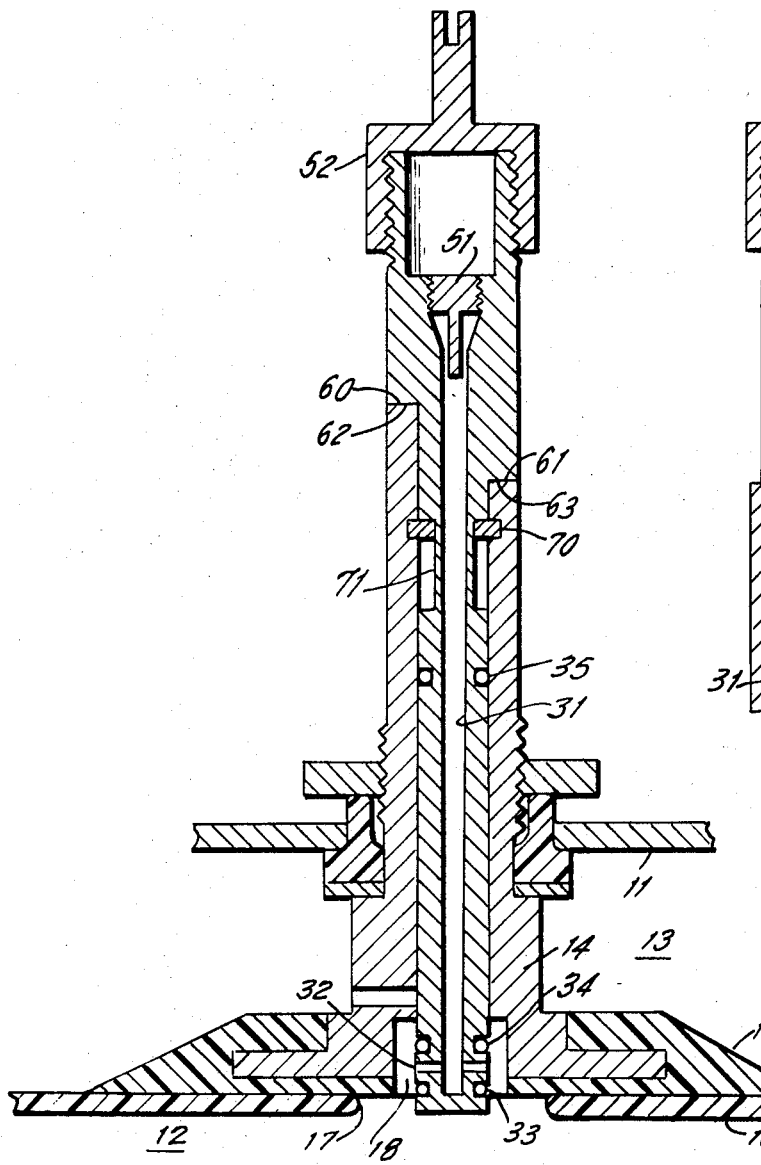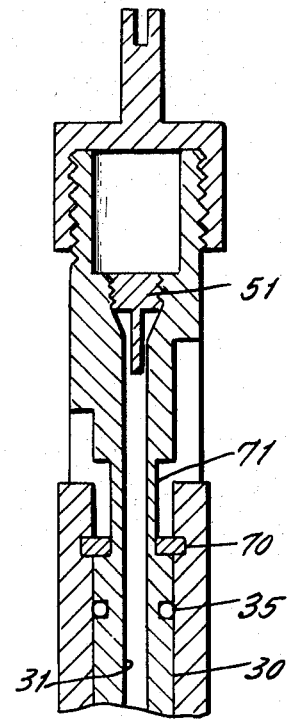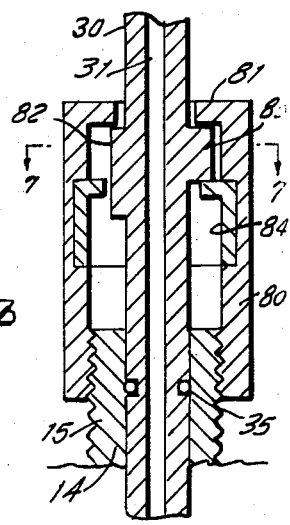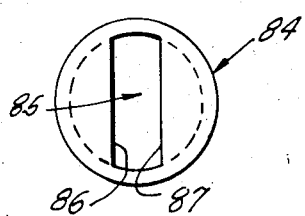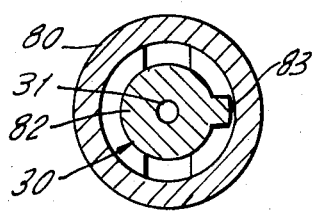

DUAL VALVE FOR PNEUMATIC TIRES

This invention relates to a valve structure, and more particularly to a single valve structure which can be used to fill both the interior of an inner tube and the volume between an automotive tire and an inner tube therein.

Tire valves are well known for tires having inner tubes and for tires of the "tubeless" type wherein the tire casing is sealed to the rim and filled by a valve extending through the rim. For maximum tire safety, it is desirable to use a combination of the two types wherein an inflated inner tube is contained within a tubeless type tire which contains air pressure in the volume between the sealed tire casing and the interior inner tube.

The present invention provides a novel single valve structure which is easily movable between two positions for filling an inner tube and the interior of a surrounding sealed casing, respectively.

Accordingly, a primary object of this invention is to provide a novel pneumatic valve structure for selectively filling or bleeding both the interior of an inner tube and the volume between the inner tube and a sealed tire casing to any desired pressure and for measurement of pressure therein.

Another object of this invention is to provide the above type valve which is easily used, inexpensive, and has a minimum number of moving parts.

These and other objects of this invention will become apparent from the following description when taken in connection with the drawings in which:

FIG. 3 is a cross section of a second embodiment of the present invention.

FIG. 4 shows the device of FIG. 3 when moved to a second position.

FIG. 5 shows a cross section of a further embodiment of the invention.

FIG. 6 is a top plan view of the locking cylinder of FIG. 5.

FIG. 7 is a cross section of FIG. 5 across section line 7—7 in FIG. 5.

Figure 1:
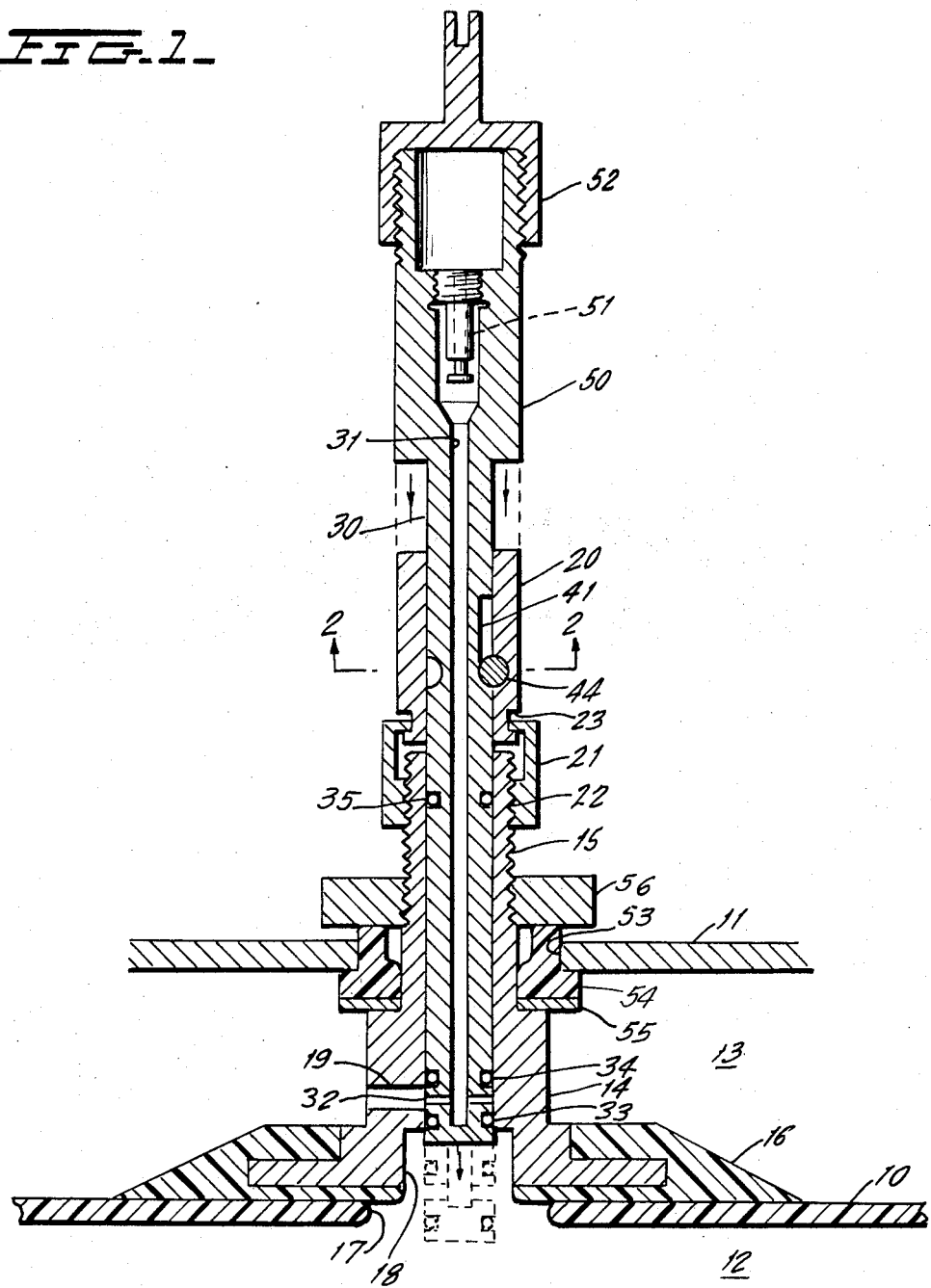
FIG. 1 is a cross-sectional view of a valve constructed in accordance with the invention.

Referring first to FIG. 1, there is shown a portion of an inner tube 10 which is contained within a tubeless tire casing which is sealed to tire rim 11. The tire valve of the invention can fill volume 12 in the interior of tube 10 and the volume 13 between the tire casing and tube 10 with compressed air from a standard air chuck normally used to fill automotive tires.

The valve of the invention is composed of a base portion 14, which may be of brass, or the like, which has an extending hollow cylindrical stem 15. Base 14 has a standard sealing disk 16 sealed thereto and sealed to tube 10 and around opening 17 in tube 10. Base 14 then has two channels 18 and 19 therein which communicate with volumes 12 and 13, respectively.

Stem 15 then has an additional length added thereto comprised of extension 20, secured to stem 15 by nut 21 which is threaded on external thread 22 of stem 15 and has the top thereof staked into slot 23 of extension 20.

Note that stem 15 and extension 20 could be formed from an integral body.

The central bore of stem 15, which extends through extension 20 and through base portion 14, then receives an axially movable hollow shaft 30 which has a central main air channel 31. The bottom of shaft 30 is closed and contains a plurality of outlet channels, such as channel 32, which are disposed between sealing rings 33 and 34 carried in suitable annular grooves formed around shaft 30. A third sealing ring 35 is disposed around a central portion of shaft 30.

Figure 2:
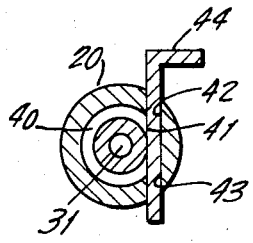
FIG. 2 is a cross section of FIG. 1 taken across section line 2—2 in FIG. 1.

A locking groove 40 is then formed around shaft 30 which communicates with a flat 41. Extension 20 then has aligned openings 42 and 43 (FIG. 2) which, with groove 40, receive a locking pin 44 which restrains the movement of shaft 30 to the extremes permitted by the axial length of flat 41 and prevents relative rotation between stem 15 (and extension 20) and shaft 30.

The upper end of shaft 30 has an enlarged diameter portion 50 having an interior thread for receiving a conventional valve core 51 which permits flow of air down shaft 31, but prevents the reverse flow of air. The outer surface of portion 50 is then threaded for receiving a conventional dust cap 52.

The valve assembly secured to inner tube 10 is assembled with the tire rim 11 by passing the assembly through opening 53 and securing with gasket 54, washer 55 and nut 56.

In operation, the shaft 30 is pushed downward to the dotted line position shown in FIG. 1 and an air chuck applied to the upper end of shaft 30 forces air through valve 51, down channel 31 to outlet channel 32 which is in channel 18 to fill inner tube 10. When the desired pressure is obtained in volume 12, shaft 30 is raised to the solid line position shown where outlet channel 32 communicates with channel 19 and volume 13, and a suitable pressure is applied within volume 13.

FIGS. 3 and 4 show a second embodiment of the invention in positions for filling volumes 12 and 13, respectively. Components similar to those of FIG. 1 have identical identifying numerals in FIGS. 3 and 4. The device of FIGS. 3 and 4 is built with an integral elongated stem 15 which, at its upper end has an L-shaped cut section defining a high shoulder 60 and low shoulder 61. Shaft 30 has a corresponding configuration with shoulders 62 and 63 nesting with shoulders 60 and 61, respectively, in the position of FIG. 1. Note that when the shoulders 60 to 63 nest as in FIG. 1 shaft 30 cannot rotate with respect to stem 15 so that cap 52 can be easily secured to the end of stem 15.

The movement of shaft 30 is then limited by the provision of a locking ring 70 snapped into a suitable groove on the inner surface of stem 15 and an elongated annular groove 71 in shaft 30 which receives ring 70.

In operation, and with the device in the position of FIG. 1, an air chuck applied to the end of shaft 30 will first fill the volume 12. The shaft 30 is then pulled out to the position of FIG. 4, with ring 70 engaging the bottom of groove 71, and with channel 32 aligned with channel 19 (FIG.3). The volume 13 may then be filled.

Referring next to FIGS. 5, 6 and 7, there is shown a further embodiment of the invention to improve inflation and gauging of the outer chamber 13 without moving the valve and to prevent rotation of the valve for securing the valve cap 52 when the stem is moved down to its lower position. In FIGS. 5 to 7, components similar to those of FIGS. 1 to 4 have similar identifying numerals.

In FIG. 5, shaft 30 is movable with respect to stem 14, as previously described, with a nut 80 threaded on threads 15 and the flange 81 being turned over the top of enlarged diameter portion 82 of shaft 30. Enlarged portion 82 has an extending key number 83, best shown in FIG. 7.

A ferrule 84 (FIG. 6) is captured in the interior of nut 80, as shown in FIG. 5, and has a slot 85 in the top thereof having parallel edges 86 and 87 spaced from one another by a distance slightly greater than the smallest diameter of portion 82 of shaft 30. When shaft 30 is in its uppermost position, shown in FIG. 5 for filling outer chamber 13, and rotated to bring the bottom of key 83 atop the unslotted top of ferrule 84, and over side 86 or 87 of ferrule 84, the shaft 30 will be latched in the uppermost position to permit gauging and inflation without moving shaft 30 downward.

Shaft 30 is moved down to inflate and gauge chamber 12 by rotating shaft 30 until key 83 lines up with slot 85. Shaft 30 is then moved down with key 83 sliding into slot 85. The cap 52 may then be rotated off or onto shaft 30 without rotating shaft 30, and chamber 12 may be inflated or gauged.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

I claim:

1. A valve for selectively filling the interior of an inner tube and the volume between said inner tube and a tire and tire rim surrounding said inner tube, said valve comprising; a base having a hollow cylindrical stem extending therefrom; a hollow cylindrical shaft concentrically and axially slidable within said hollow stem; an outlet channel in one end of said shaft extending from the hollow interior thereof to the exterior of said shaft; first means connecting said base to the interior of said inner tube; second means connecting said base to said tire rim; first channel means in said base communicating with the interior of said inner tube; second channel means in said base communicating with the volume between the interior of said tire and the exterior of said inner tube; stop means connected to said cylindrical shaft for limiting the axial movement of said cylindrical shaft between a first and second position with respect to said cylindrical stem; said outlet channel communicating with said first channel means when said shaft is in said first position; said outlet channel communicating with said second channel means when said shaft is in said second position. First locking means associated with said stem, second locking means associated with said shaft, said first and second locking means being engageable by rotating said shaft in said second position to prevent axial movement of said shaft within said stem from said second position toward said first position.

2. The device as set forth in claim 1 wherein said shaft has a valve core in the other end thereof.

3. The device as set forth in claim 1, wherein said first locking means also prevents rotation of said shaft relative to said stem when said shaft is in said first position.

4. The device as set forth in claim 1 wherein said first locking means is a ferrule having a slotted end said ferrule being connected to said stem and surrounding said shaft and said second locking means is a protrusion from said shaft which passes through said slotted ferrule when properly aligned therewith but which abuts the exterior of the slotted end of said ferrule when said shaft is rotated while in said second position.

5. The device as set forth in claim 1, wherein said first locking means comprises a pin extending through aligned openings in said stem and said second locking means comprises a groove in said shaft so positioned as to be adjacent said pin when said shaft is in said second position, said groove being capable of engaging said pin when said shaft is rotated in said second position.

6. The device as set forth in claim 1 wherein said first locking means comprises the higher of two shoulders defined by an L-shaped cut in said stem and said second locking means comprises the lower of two shoulders defined by an L-shaped cut in said shaft, said higher and lower shoulders abutting one another when said shaft is rotated in said second position.